(12) United States Patent
Huang et al.

(10) Patent No.: US 12,542,475 B2
(45) Date of Patent: Feb. 3, 2026

(54) APPARATUS AND METHOD FOR REDUCING STAND-BY POWER CONSUMPTION IN ISOLATED POWER CONVERSION SYSTEM

(71) Applicant: Diodes Incorporated, Plano, TX (US)

(72) Inventors: Feng-Jung Huang, New Taipei (TW); Adrian Wang, Los Gatos, CA (US); Ko-Yen Lee, New Taipei (TW); Chien-Jen Su, New Taipei (TW); Hao-Ming Chen, New Taipei (TW)

(73) Assignee: Diodes Incorporated, Plano, TX (US)

( * ) Notice: Subject to any disclaimer, the term of this patent is extended or adjusted under 35 U.S.C. 154(b) by 206 days.

(21) Appl. No.: 18/387,742

(22) Filed: Nov. 7, 2023

(65) Prior Publication Data
US 2025/0149966 A1    May 8, 2025

(51) Int. Cl.
*H02M 1/00*   (2007.01)
*H02M 3/335*  (2006.01)

(52) U.S. Cl.
CPC ..... *H02M 1/0035* (2021.05); *H02M 3/33592* (2013.01)

(58) Field of Classification Search
CPC ............. H02M 1/0003; H02M 1/0016; H02M 1/0019; H02M 1/0025; H02M 1/0032;
(Continued)

(56) References Cited

U.S. PATENT DOCUMENTS 10,985,663 B2 *  4/2021  Chung .............. H02M 3/33523
2011/0255311 A1  10/2011 Hsu et al.
(Continued)

FOREIGN PATENT DOCUMENTS

CN     206498339 U    9/2017
CN     112789797 B    5/2022
(Continued)

OTHER PUBLICATIONS

International Search Report and Written Opinion for Application No. PCT/US2024/028443, mailed on Aug. 27, 2024, 11 pages.
(Continued)

*Primary Examiner* — Thienvu V Tran
*Assistant Examiner* — Carlos O Rivera-Perez
(74) *Attorney, Agent, or Firm* — AP3 Law Firm PLLC

(57) ABSTRACT

An apparatus includes a secondary controller coupled to a secondary circuit of a power conversion system, and a primary controller coupled to a primary circuit of the power conversion system, the primary controller being coupled to the secondary controller through an isolation interface, wherein the secondary controller is configured to detect whether a load is coupled to the power conversion system, in response to the load being disconnected from the power conversion system, communicate with the primary controller through pulling down a secondary feedback node in the secondary circuit and a primary feedback node in the primary circuit for a first predetermined time, provide a high impedance at the secondary feedback node to reduce power consumption, and in response to the load being reconnected to the power conversion system, communicate with the primary controller through pulling down the secondary feedback node in the secondary circuit for a second predetermined time.

20 Claims, 8 Drawing Sheets

(58) Field of Classification Search
CPC .... H02M 1/0035; H02M 1/0038; H02M 1/36; H02M 1/08; H02M 1/088; H02M 1/092; H02M 3/01; H02M 3/015; H02M 3/22; H02M 3/24; H02M 3/28; H02M 3/315; H02M 3/3155; H02M 3/325; H02M 3/335; H02M 3/33507; H02M 3/33515; H02M 3/33523; H02M 3/3353; H02M 3/33538; H02M 3/33546; H02M 3/33553; H02M 3/33576; H02M 3/33592; Y02B 70/10
USPC ................ 363/15–21.18, 89, 106, 108, 109; 323/266, 271–275, 280, 282–287, 351, 323/902
See application file for complete search history.

(56) References Cited

U.S. PATENT DOCUMENTS

2013/0215651 A1  8/2013  Liao et al.
2013/0272035 A1  10/2013  Strzalkowski
2015/0095537 A1  4/2015  Sengoku
2019/0199222 A1  6/2019  Lin et al.
2022/0085726 A1  3/2022  Kong et al.

FOREIGN PATENT DOCUMENTS

TW    I463780 B    12/2014
TW    I496396 B    8/2015
TW    I580162 B    4/2017
TW    I786589 B    12/2022

OTHER PUBLICATIONS

Office Action and Search Report for Taiwan Patent Application No. 113108600, mailed Oct. 17, 2024, 8 pages.

* cited by examiner

APPARATUS AND METHOD FOR REDUCING STAND-BY POWER CONSUMPTION IN ISOLATED POWER CONVERSION SYSTEM

TECHNICAL FIELD

The present invention relates to a feedback control apparatus and method, and, in particular embodiments, to a feedback control apparatus and method for reducing power consumption in an isolated power conversion system.

BACKGROUND

A power conversion system (e.g., an adaptor) is used to convert an alternating current (ac) voltage from the utility company into a direct current (dc) voltage suitable for electronic devices. The power conversion system usually includes an ac/dc stage (e.g., a rectifier) and an isolated dc/dc stage (e.g., an isolated dc/dc converter). The ac/dc stage converts the power from the ac utility line and establishes a dc bus for the isolated dc/dc stage. The ac/dc stage may comprise a variety of electromagnetic interference (EMI) filters and a bridge rectifier formed by four diodes. The EMI filters are employed to attenuate both differential mode noise and common mode noise. The bridge rectifier converts the ac voltage into a full-wave rectified dc voltage. Such a full-wave rectified dc voltage provides a steady dc input voltage for the isolated dc/dc stage through a plurality of smoothing capacitors coupled to the output of the bridge rectifier.

The isolated dc/dc stage converts the voltage of the dc bus to a voltage suitable to electronics loads such as tablets, printers, mobile phones, personal computers, any combinations thereof and the like. The isolated dc/dc stage can be implemented by using different power topologies, such as flyback converters, forward converters, half bridge converters, full bridge converters and the like.

In some applications (e.g., an adaptor for powering a personal computer), a flyback converter is employed to regulate the output voltage of the power conversion system. The flyback converter includes a transformer, which provides galvanic isolation for satisfying various safety requirements. The flyback converter may comprise three controllers, namely a primary side controller placed at the primary side for driving a main switch (primary switch) of the flyback converter, a synchronous rectifier controller placed at the secondary side for controlling the on and off of the synchronous switch to reduce secondary side conduction losses, and a secondary side controller placed at the secondary side for sensing the output voltage and communicating with the primary side controller for achieve various system functions such as closed-loop regulation, universal serial bus (USB) power delivery protocols and the like.

The flyback converter provides regulated output voltages to many devices that utilize a regulated output voltage. The primary and secondary controllers control the conversion of power. The controllers have an active mode to actively control the flyback converter when the power conversion system is providing power to a load. To save energy, the primary and secondary controllers may have a standby mode. During the standby mode, the primary and secondary controllers enter into a low power consumption state because the power demanded by the load connected to the power conversion system does not require the primary and secondary controllers to control the flyback converter.

In the standby mode, in order to maintain the regulation of the output voltage, the feedback circuits (e.g., reference voltage, error amplifier, and opto-coupler) of the flyback converter must keep running with the load being disconnected from the power conversion system. This means that the power consumption of the feedback circuit cannot be saved. Therefore, these feedback circuits always consume power even when the load device is disconnected. It would be desirable to have a simple and reliable control method to reduce the power consumption of the feedback circuits, thereby achieving better power conversion efficiency.

SUMMARY

These and other problems are generally solved or circumvented, and technical advantages are generally achieved, by preferred embodiments of the present disclosure which provide a feedback control apparatus and method for reducing power consumption in an isolated power conversion system.

In accordance with an embodiment, an apparatus comprises a secondary controller coupled to a secondary circuit of a power conversion system, and a primary controller coupled to a primary circuit of the power conversion system, the primary controller being coupled to the secondary controller through an isolation interface, wherein the secondary controller is configured to detect whether a load is coupled to the power conversion system, in response to the load being disconnected from the power conversion system, communicate with the primary controller to enter a sleep mode through pulling down a secondary feedback node in the secondary circuit and a primary feedback node in the primary circuit for a first predetermined time, wherein in the sleep mode, both primary and secondary feedback circuits are disabled to reduce power consumption, provide a high impedance at the secondary feedback node to reduce power consumption, and in response to the load being reconnected to the power conversion system, communicate with the primary controller to exit the sleep mode through pulling down the secondary feedback node in the secondary circuit for a second predetermined time, wherein after exiting the sleep mode, the primary and secondary feedback circuits are enabled to recover feedback loop control to regulate an output voltage of the power conversion system.

In accordance with another embodiment, a method comprises detecting, by a secondary controller, whether a load is coupled to a power conversion system comprising a primary circuit and a secondary circuit, in response to the load being disconnected from the power conversion system, communicating with a primary controller through pulling down a secondary feedback node in the secondary circuit and a primary feedback node in the primary circuit for a first predetermined time, configuring the secondary feedback node to function as a high impedance node to reduce power consumption, and in response to the load being reconnected to the power conversion system, communicating with the primary controller through pulling down the secondary feedback node in the secondary circuit for a second predetermined time.

In accordance with yet another embodiment, a system comprises an isolated power converter configured to be coupled between a power source and a load, a secondary controller coupled to a secondary circuit of the system, and a primary controller coupled to a primary circuit of the system, the primary controller being coupled to the secondary controller through an isolation interface, wherein the secondary controller is configured to detect whether a load is coupled to the isolated power converter, inform the primary controller in response to the load being disconnected from the isolated power converter, and reduce power consumption of the secondary circuit through configuring one secondary feedback node as a high impedance node, and the primary controller is configured to disable a feedback control loop of the isolated power converter once the load is disconnected from the isolated power converter.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a feedback control apparatus and method for reducing power consumption in an isolated power conversion system. The disclosure may also be applied, however, to a variety of power conversion systems. Hereinafter, various embodiments will be explained in detail with reference to the accompanying drawings.

Figure 1:
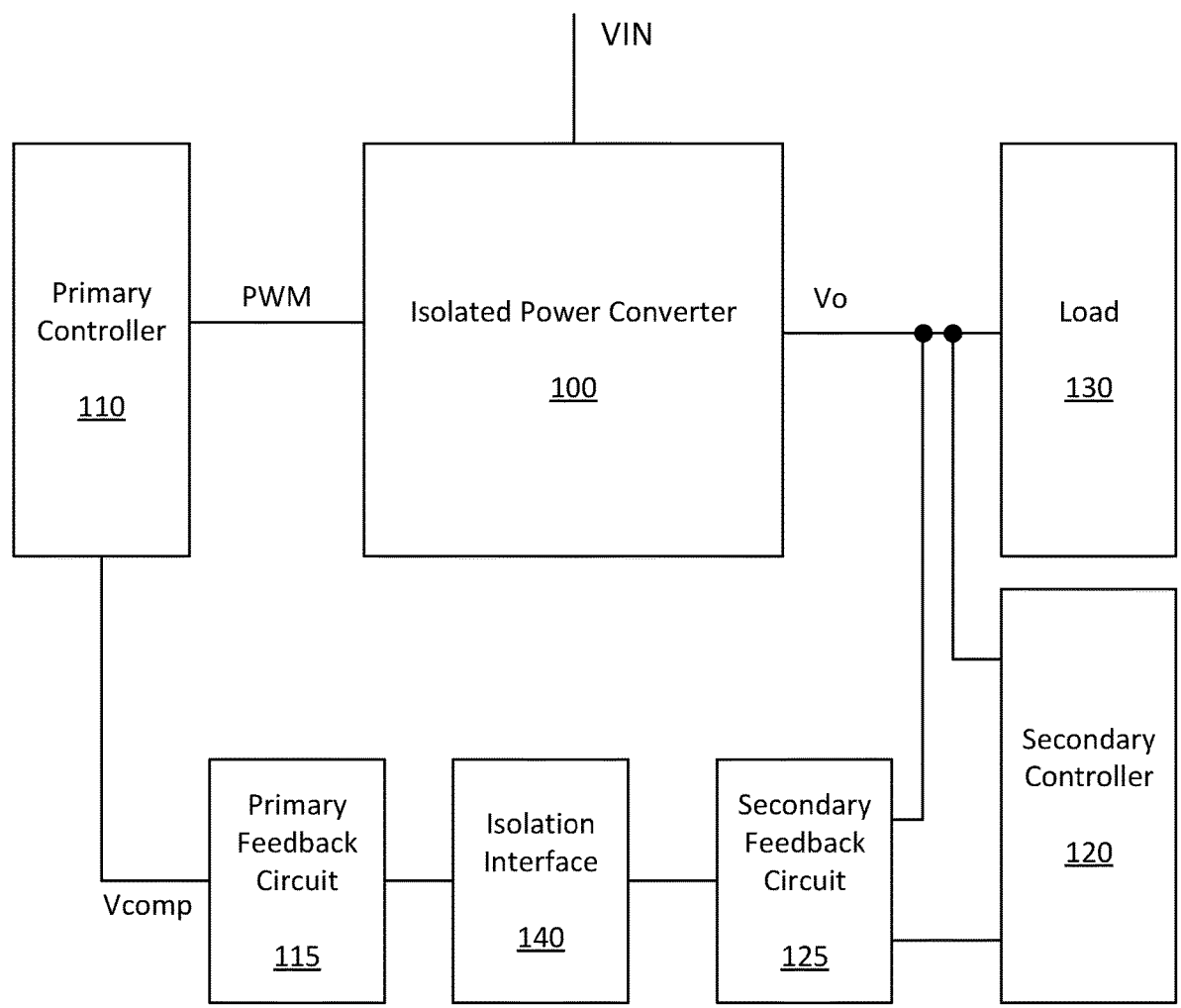
FIG. 1 illustrates a block diagram of a power conversion system in accordance with various embodiments of the present disclosure.

FIG. 1 illustrates a block diagram of a power conversion system in accordance with various embodiments of the present disclosure. The power conversion system comprises an isolated power converter 100 configured to be coupled between a power source VIN and a load 130. The isolated power converter 100 is employed to convert a direct current voltage from one level (e.g., VIN) to another level (e.g., Vo) suitable for the load 130. In some embodiments, the isolated power converter 100 is a flyback converter. In alternative embodiments, the isolated power converter 100 may be other suitable power converters such as a full-bridge power converter, a half-bridge power converter, an LLC resonant converter, a forward converter and the like.

As shown in FIG. 1, the power conversion system further comprises a primary controller 110, a secondary controller 120, a primary feedback circuit 115, a secondary feedback circuit 125 and an isolation interface 140. In some embodiments, the primary controller 110 is a PWM controller configured to receive a feedback signal Vcomp from a feedback node COMP, and generate a PWM signal applied to a primary switch of the isolated power converter 100. The secondary controller 120 is a universal serial bus (USB) power delivery (PD) controller configured to provide flexible power delivery along with data over a single cable. Both the PWM controller and the USB PD controller are well known, and hence are not discussed in further detail herein.

It should be noted that the block diagram shown in FIG. 1 is merely an example, which should not unduly limit the scope of the claims. One of ordinary skill in the art would recognize many variations, alternatives, and modifications. For example, the power conversion system may comprise a synchronous rectifier controller. In some embodiments, the synchronous rectifier controller is a standalone integrated chip. In alternative embodiments, the synchronous rectifier controller is part of the secondary controller 120.

As shown in FIG. 1, the secondary controller 120 is coupled to the secondary feedback circuit 125 and the output of the isolated power converter 100. The primary controller 110 is coupled to the primary feedback circuit 115. The primary controller 110 is coupled to the secondary controller 120 through the primary feedback circuit 115, the isolation interface 140 and the secondary feedback circuit 125.

In some embodiments, the isolation interface 140 is implemented as an opto-coupler. In alternative embodiments, the isolation interface 140 may be other suitable semiconductor devices such as digital isolators and the like.

The secondary feedback circuit 125 includes a resistor divider, a compensation network, and a feedback control integrated circuit (e.g., an operation amplifier or a shunt voltage regulator). The primary feedback circuit 115 comprises a pull-up resistor and a capacitor. The detailed structures of the secondary feedback circuit 125 and the primary feedback circuit 115 will be discussed in detail below with respect to FIGS. 3-4. Throughout the description, the secondary feedback circuit 125 may be alternatively referred to as the secondary circuit. The primary feedback circuit 115 may be alternatively referred to as the primary circuit.

In operation, the secondary controller 120 is configured to detect whether the load 130 is coupled to the isolated power converter 100. In response to the load 130 being disconnected from the isolated power converter 100, the secondary controller 120 is configured to inform the primary controller 110 through controlling the voltage on the feedback node COMP (shown in FIGS. 3-4), and reduce power consumption of the primary and secondary feedback circuits 115, 125 through configuring the secondary feedback node (e.g., OCDRV shown in FIGS. 3-4) as a high impedance node. The primary controller 110 is configured to disable a feedback control loop of the isolated power converter 100 once the load 130 is disconnected from the isolated power converter 100. As a result, the isolated power converter enters into a sleep mode. In the sleep mode, the secondary controller 120 turns off the function of the feedback circuits (e.g., reference voltage, error amplifier) and cuts off the current flowing through the isolation interface 140 (e.g., optocoupler). Correspondingly, the primary controller 110 breaks the feedback loop and turns off most functions to reduce power consumption. The detailed operating principles of the primary controller 110 and the secondary controller 120 will be described below with respect to FIGS. 3-7.

One advantageous feature of have the sleep mode described above is the standby power of the power conversion system is reduced to about 3 milliwatts from about 25 milliwatts.

It should be noted that FIG. 1 illustrates only relevant elements of the power conversion system that may include many other elements. The elements of the power conversion system illustrated herein is limited solely for the purpose of clearly illustrating the inventive aspects of the various embodiments. One of ordinary skill in the art would recognize many variations, alternatives, and modifications. For example, depending on different applications and design needs, a switch may be coupled between the output of the isolated power converter and the load. The on and off of switch is controlled by the secondary controller 120.

Figure 2:
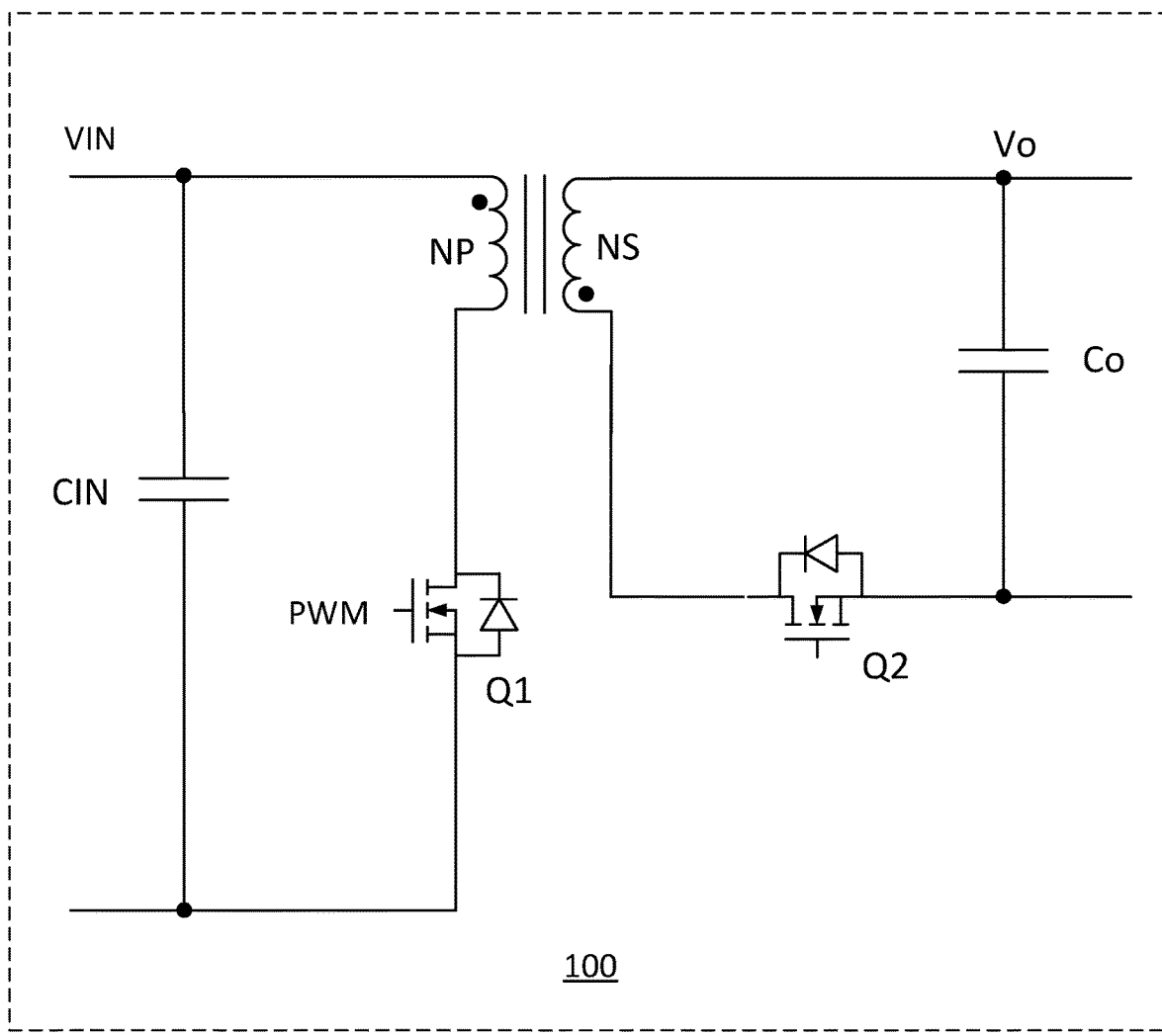
FIG. 2 illustrates a schematic diagram of the isolated power converter shown in FIG. 1 in accordance with various embodiments of the present disclosure.

FIG. 2 illustrates a schematic diagram of the isolated power converter shown in FIG. 1 in accordance with various embodiments of the present disclosure. The isolated power converter is implemented as a flyback converter as shown in FIG. 2. The flyback converter comprises an input capacitor CIN, a primary switch Q1, a transformer, a secondary rectifier and an output capacitor Co. The secondary rectifier is formed by a synchronous switch Q2.

The voltage of the power source VIN is coupled to the primary switch Q1 through the primary winding NP of the transformer. The primary switch Q1 is connected to ground. In some embodiments, a current sense resistor (not shown) may be connected between the primary switch Q1 and ground. Furthermore, a reset device (not shown) may be connected in parallel with the primary winding NP. The reset device is employed to reset the magnetizing current of the flyback converter. The reset device is formed by a diode, a resistor and a clamp capacitor. The reset device is also known as an RCD reset device.

Referring back to FIG. 1, the primary controller 110 may receive a plurality of signals such as the feedback signal Vcomp, a current sense signal detected from the current sense resistor, and the input voltage signal. Based upon the received signals, the primary controller 110 generates a gate drive signal PWM for driving the primary switch Q1.

According to the operating principle of the flyback converter, the amount of time that the primary switch Q1 conducts current during a switching period T is determined by a duty cycle D. The duty cycle D may have a value from 0 to 1.

As shown in FIG. 2, the secondary rectifier is implemented as a synchronous switch. The synchronous switch may be an n-type MOSFET device. It should further be noted that while FIG. 2 illustrates a single switching element for the synchronous switch, one of ordinary skill in the art would recognize many variations, alternatives, and modifications. For example, the synchronous switch may comprise a plurality of MOSFET devices connected in parallel. Furthermore, depending on different applications and design needs, the synchronous switch may be replaced by a diode.

According to the operation principle of the flyback converter, when the input voltage source VIN is applied to the primary side winding NP of the transformer through the turn-on of the primary switch Q1, the polarity of the secondary side winding NS of the transformer is so configured that the synchronous switch (Q2) is turned off and the load (not shown) connected to the flyback converter is supplied by the energy stored in the output capacitor Co. On the other hand, when the primary side switch Q1 is turned off and the synchronous switch (Q2) is turned on, the energy stored in the transformer is transferred to the load through the turned-on synchronous switch. The detailed operation of the secondary side of the flyback converter is well known in the art, and hence is not discussed in further detail herein.

In accordance with an embodiment, the switching elements of FIG. 2 (e.g., switches Q1 and Q2) may be metal oxide semiconductor field-effect transistor (MOSFET) devices. Alternatively, the switching elements can be any controllable switches such as insulated gate bipolar transistor (IGBT) devices, integrated gate commutated thyristor (IGCT) devices, gate turn-off thyristor (GTO) devices, silicon-controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 2 shows the switches Q1 and Q2 are implemented as single n-type transistors, a person skilled in the art would recognize there may be many variations, modifications and alternatives. For example, depending on different applications and design needs, the switches may be implemented as p-type transistors. Furthermore, each switch shown in FIG. 2 may be implemented as a plurality of switches connected in parallel. Moreover, a capacitor may be connected in parallel with one switch to achieve zero voltage switching (ZVS)/zero current switching (ZCS).

Figure 3:
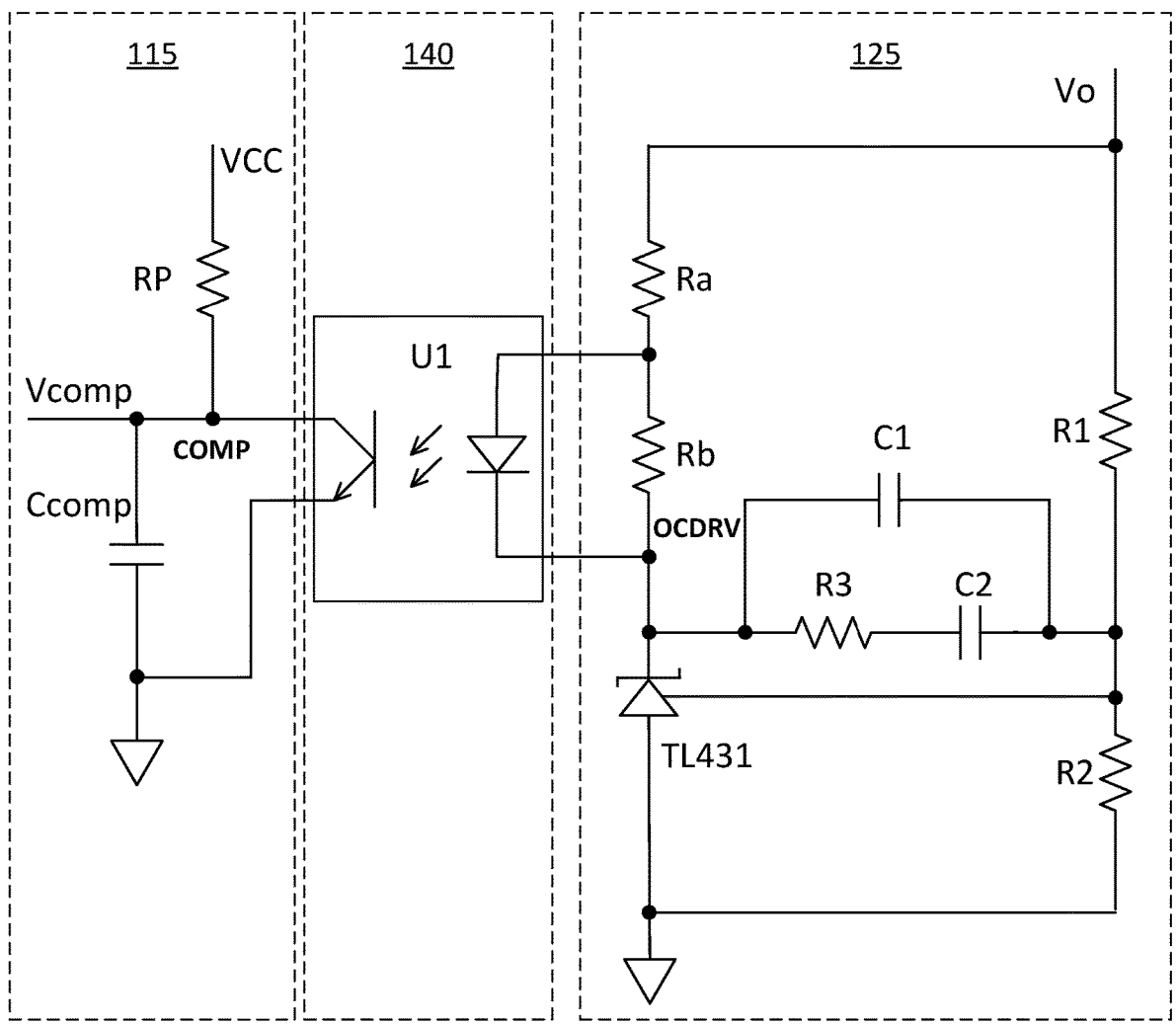
FIG. 3 illustrates a schematic diagram of a first implementation of the primary feedback circuit, the isolation interface and the secondary feedback circuit shown in FIG. 1 in accordance with various embodiments of the present disclosure.

FIG. 3 illustrates a schematic diagram of a first implementation of the primary feedback circuit, the isolation interface and the secondary feedback circuit shown in FIG. 1 in accordance with various embodiments of the present disclosure. The isolation interface 140 is implemented as an opto-coupler U1 comprising a light-emitting diode and a phototransistor. The secondary circuit 125 comprises a resistor divider, a compensation network, a three-terminal adjustable precision shunt voltage regulator integrated circuit TL431, a current limit resistor Ra and a bias resistor Rb.

The resistor divider comprises a first resistor R1 and a second resistor R2 connected in series between Vo and ground. The compensation network is formed from R3, C1 and C2. As shown in FIGS. 3, R3 and C2 are connected in series between a common node of the bias resistor Rb and the three-terminal adjustable precision shunt voltage regulator integrated circuit TL431, and a common node of R1 and R2. C1 is connected in parallel with the series-connected R3 and C2. This is a Type 2 compensator providing a phase boost so as to achieve a stable feedback loop.

As shown in FIG. 3, a cathode of the three-terminal adjustable precision shunt voltage regulator integrated circuit TL431 is connected to the cathode of the light-emitting diode. A reference terminal of the three-terminal adjustable precision shunt voltage regulator integrated circuit TL431 is connected to the compensation network and the resistor divider. An anode of the three-terminal adjustable precision shunt voltage regulator integrated circuit TL431 is connected to ground. The cathode of the light-emitting diode is a secondary feedback node in the secondary circuit. As shown in FIG. 3, the secondary feedback node is denoted as OCDRV.

The primary circuit 115 comprises a pull-up resistor RP and a capacitor Ccomp connected in series between a bias voltage VCC and ground. A first terminal of the phototransistor is connected to a common node of the pull-up resistor RP and the capacitor Ccomp. A second terminal of the phototransistor is connected to ground. The common node of the pull-up resistor RP and the capacitor Ccomp is a primary feedback node. The primary feedback node is denoted as COMP.

In normal operation, when the load 130 is connected to the isolated power converter 100, the secondary circuit 125 detects the output voltage and sends a feedback signal through the opto-coupler to the primary circuit 115. Based on the feedback signal, the primary controller 110 generates the PWM signal to control the on and off of the primary switch Q1 so that the output voltage of the flyback converter is regulated to achieve a set output voltage. In normal operation, the secondary bias current is about 5 milliamperes. The primary bias current is about 5 milliamperes.

In operation, when the load 130 is disconnected from the isolated power converter 100, the secondary controller 120 configures the secondary feedback node OCDRV as a high impedance node to reduce the secondary bias current, and the primary controller 110 disables the feedback loop of the isolated power converter 100 to reduce the primary bias current. Once the secondary feedback node OCDRV is configured as a high impedance node, the secondary circuit enters into a secondary sleep mode. The secondary bias current is reduced from about 5 milliamperes to about 30 microamperes. Likewise, once the feedback loop of the isolated power converter 100 is disabled, the primary bias current is reduced from about 5 milliamperes to about 70 microamperes.

In operation, the secondary controller 120 is configured to detect whether the load 130 is coupled to the power conversion system. In response to the load 130 being disconnected from the power conversion system, the secondary controller 120 communicates with the primary controller 110 through pulling down the secondary feedback node OCDRV in the secondary circuit and the primary feedback node COMP in the primary circuit for a first predetermined time (e.g., 240 milliseconds). Then, the secondary controller 120 configures the secondary feedback node OCDRV as a high impedance node to reduce power consumption in the secondary circuit. Furthermore, in response to the load 130 being reconnected to the power conversion system, the secondary controller 120 communicates with the primary controller 110 through pulling down the secondary feedback node in the secondary circuit for a second predetermined time (e.g., 1 millisecond). Once the secondary controller 120 wakes up the primary controller 110, the primary controller 110 exits the sleep mode and restarts the flyback converter.

In operation, the primary controller 110 is configured to detect whether a voltage on the primary feedback node COMP in the primary circuit is lower than a predetermined voltage (e.g., 600 millivolts) for a third predetermined time (e.g., 200 milliseconds). In response to the voltage on the primary feedback node COMP lower than the predetermined voltage for the third predetermined time, the primary controller 110 enters into a first sleep mode through disabling the feedback loop of the power conversion system. Then, the primary controller 110 enters into a second sleep mode once the voltage on the primary feedback node COMP increases to a level greater than the predetermined voltage (e.g., 600 millivolts). Furthermore, in response to the voltage on the primary feedback node COMP lower than the predetermined voltage again, the primary controller 110 exits the sleep mode, and enables the feedback loop to restart the power conversion system.

Figure 4:
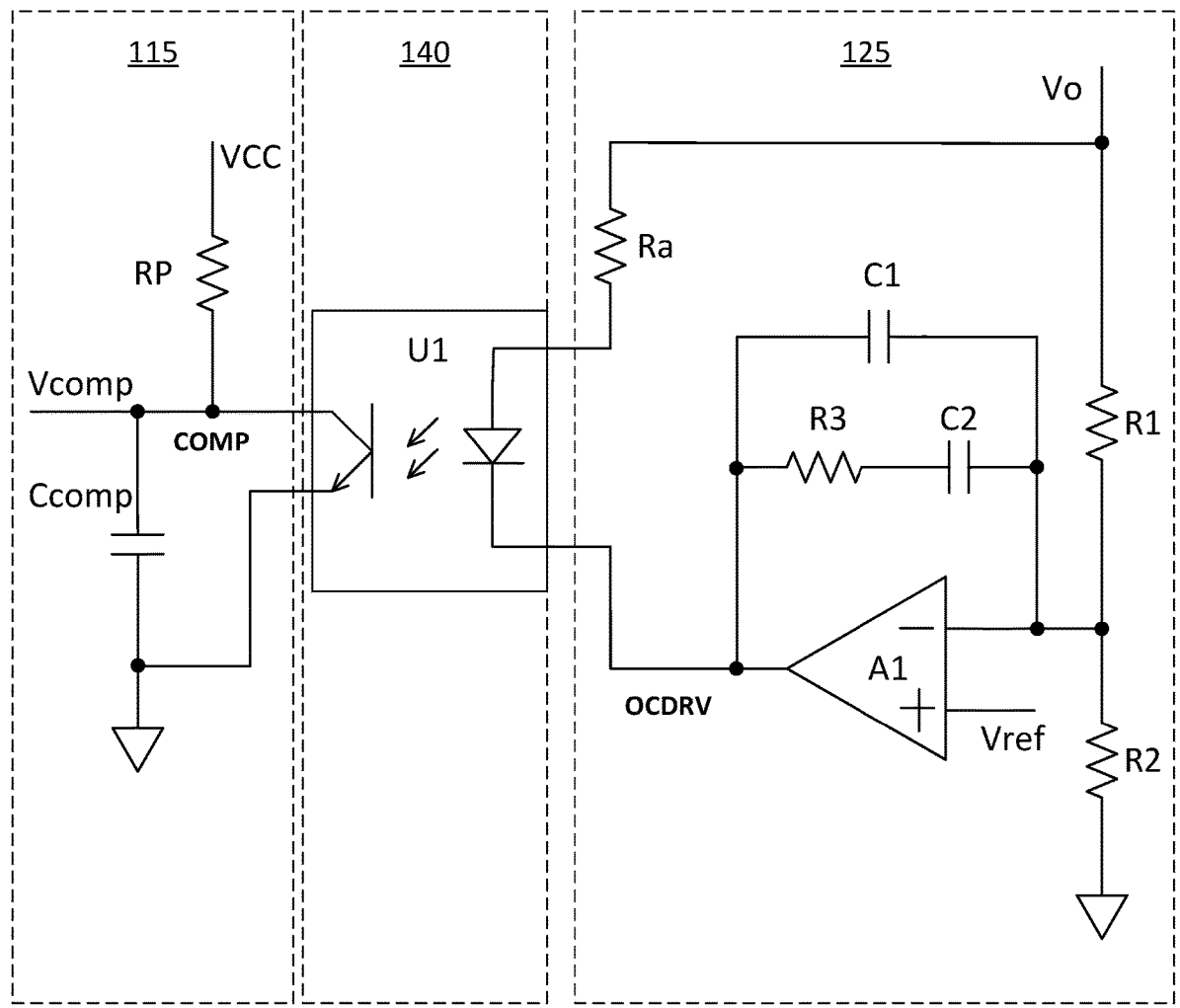
FIG. 4 illustrates a schematic diagram of a second implementation of the primary feedback circuit, the isolation interface and the secondary feedback circuit shown in FIG. 1 in accordance with various embodiments of the present disclosure.

FIG. 4 illustrates a schematic diagram of a second implementation of the primary feedback circuit, the isolation interface and the secondary feedback circuit shown in FIG. 1 in accordance with various embodiments of the present disclosure. The second implementation shown in FIG. 4 is similar to the first implementation shown in FIG. 3 except that the three-terminal adjustable precision shunt voltage regulator integrated circuit TL431 is replaced by an operation amplifier A1.

As shown in FIG. 4, the secondary circuit 125 comprises a resistor divider, a compensation network, and an operation amplifier A1. The compensation network is connected between an output of the operation amplifier A1 and an inverting input of the operation amplifier A1. The inverting input of the operation amplifier A1 is connected to a common node of R1 and R2. The non-inverting input of the operation amplifier A1 is connected to a predetermined reference Vref. The operating principle of the second implementation is similar to the operating principle of the first implementation, and hence is not discussed herein to avoid unnecessary repetition.

Figure 5:
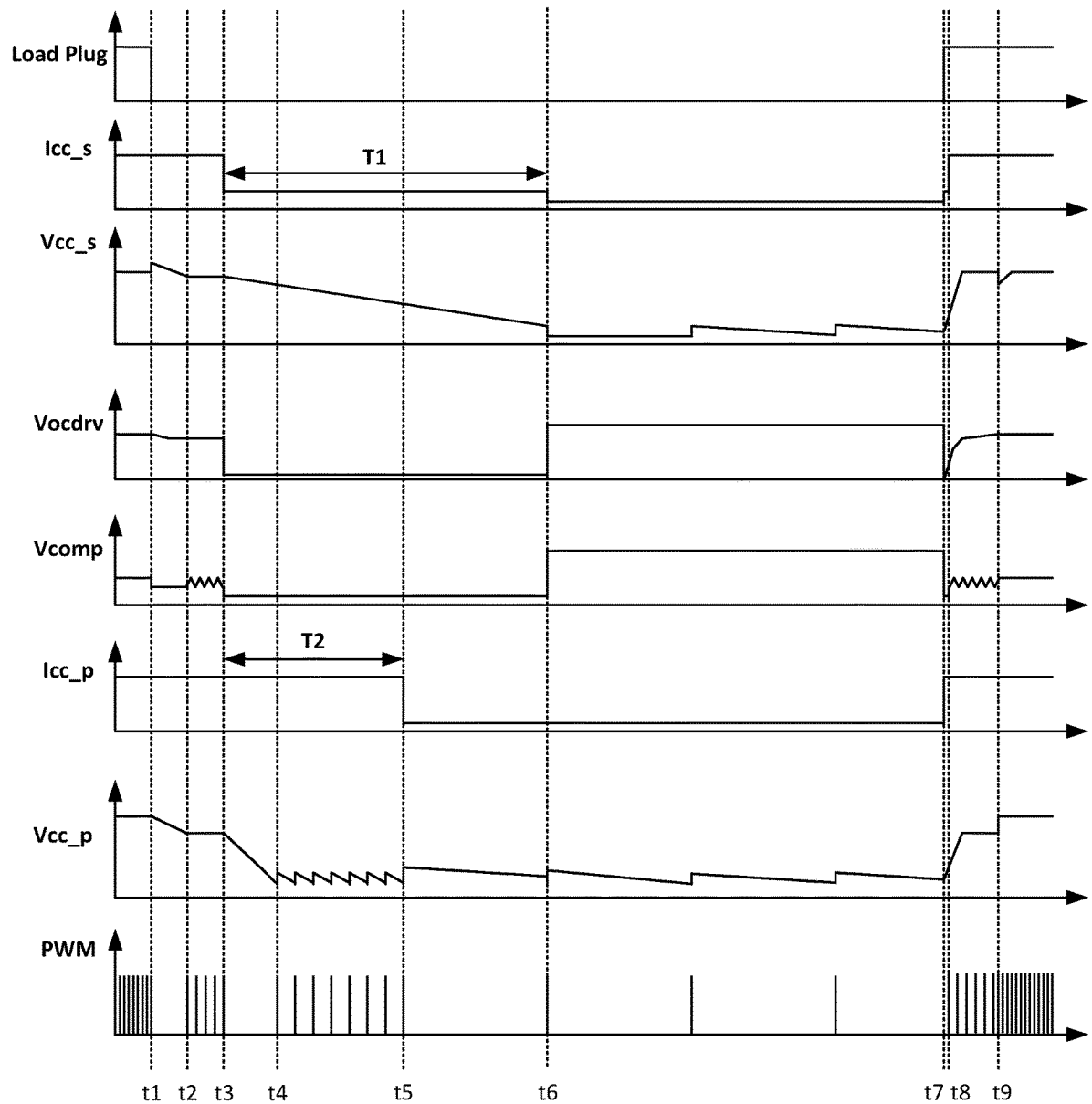
FIG. 5 illustrates various waveforms associated with the circuits shown in FIGS. 3-4 in accordance with various embodiments of the present disclosure.

FIG. 5 illustrates various waveforms associated with the circuits shown in FIGS. 3-4 in accordance with various embodiments of the present disclosure. The horizontal axis of FIG. 5 represents intervals of time. There are eight rows in FIG. 5. The first row represents a load plug signal indicative of the status of the load 130. When the load 130 is connected to the isolated power converter 100, the load plug signal has a logic high state. On the other hand, when the load 130 is disconnected from the isolated power converter, the load plug signal has a logic low state. The second row represents the secondary bias current Icc_s. The third row represents the secondary side bias voltage Vcc_s. The fourth row represents the voltage on the secondary feedback node OCDRV. The fifth row represents the voltage on the primary feedback node COMP. The sixth row represents the primary bias current Icc_p. The seventh row represents the primary bias voltage Vcc_p. The eighth row represents the PWM signal generated by the primary controller 110.

Prior to t1, the load 130 is connected to the isolated power converter 100. The load plug signal has a logic high state. The secondary bias current Icc_s is about 5 milliamperes. The secondary bias voltage Vcc_s is about 5 volts. The voltage on the secondary feedback node OCDRV is about 3 volts. The voltage on the primary feedback node COMP is greater than 600 millivolts. The primary bias current Icc_p is about 5 milliamperes. The primary bias voltage Vcc_p is about 16 volts. The primary controller 110 operates in a PWM mode as indicated by the PWM signal shown in FIG. 5.

At t1, the secondary controller 120 detects the load 130 has been disconnected from the isolated power converter 100. In response to this change, the load plug signal changes from a logic high state to a logic low state as shown in FIG. 5. From t1 to t2, both the voltage on the secondary feedback node OCDRV and the voltage on the primary feedback node COMP drop in response to the load change.

It should be noted that in normal operation, the voltage on the primary feedback node COMP is related to the load. The voltage on the primary feedback node COMP is kept high for delivering high power under heavy loads. When the load decreases, the voltage on the primary feedback node COMP will decrease with the load.

From t2 to t3, the primary controller 110 enters into a burst mode to regulate the output voltage and reduce switching losses. The primary bias current and the secondary bias current remain the same.

From t3 to t6, the voltage on the secondary feedback node OCDRV is pulled to low by the secondary controller 120. In particular, both the shunt voltage regulator integrated circuit TL431 shown in FIG. 3 and the operation amplifier A1 shown in FIG. 4 have an open-drain structure. In other words, a transistor (e.g., an n-type MOS transistor) is connected between the secondary feedback node OCDRV and ground. The gate of this transistor is connected to an output of the error amplifier. The secondary controller 120 is able to pull the secondary feedback node OCDRV to low through fully turning on this transistor.

In some embodiments, the time duration from t3 to t6 is denoted as T1 as shown in FIG. 5. In some embodiments, T1 is about 240 milliseconds. At t3, the secondary bias current changes from about 5 milliamperes to about 0.6 milliamperes. From t3 to t6, in response to a low voltage on the secondary feedback node OCDRV, the voltage on the primary feedback node COMP drops to a voltage level lower than a predetermined voltage (e.g., 600 millivolts).

The time duration from t3 to t5 is denoted as T2 as shown in FIG. 5. In some embodiments, T2 is about 200 milliseconds. At t5, the primary controller 110 detects that the voltage on the primary feedback node COMP stays below the predetermined voltage (e.g., 600 millivolts) for more than T2 (e.g., 200 milliseconds). This indicates the load 130 has been disconnected from the isolated power converter 100. At t5, the primary controller 110 enters into a first sleep mode in which the primary controller 110 disables the feedback control loop of the isolated power converter 100. After the feedback control loop of the isolated power converter has been disabled, the primary controller 110 stops regulating the output voltage and its bias current is reduced from about 5 milliamperes to about 70 microamperes.

At t6, in order to reduce the power consumption of the feedback circuits including the primary feedback circuit 115, the secondary feedback circuit 125 and the isolation interface 140, the secondary controller 120 configures the secondary feedback node OCDRV as a high impedance node. As a result, the voltage on the secondary feedback node OCDRV increases to a level approximately equal to Vo. The secondary controller 120 enters into a sleep mode in which the secondary feedback circuits (e.g., the secondary feedback circuit 125) have been disabled. The secondary bias current is reduced from about 600 microamperes to about 30 microamperes. In response to the voltage change on the secondary feedback node OCDRV, the voltage on the primary feedback node COMP increases from a low voltage (e.g., less than 600 millivolts) to a high voltage approximately equal to VCC (e.g., 5 V).

From t6 to t7, the secondary controller 120 stays in the sleep mode. The primary controller 110 operates in a second sleep mode in which the primary bias current remains the same. From t6 to t7, the primary controller 110 turns on the primary switch Q1 occasionally to maintain the primary bias voltage and the secondary bias voltage as shown in FIG. 5.

At t7, the load plug signal changes from a logic low state to a logic high state. The secondary controller 120 detects the load 130 being reconnected to the isolated power converter 100. From t7 to t8, the secondary controller 120 pulls the secondary feedback node OCDRV down to a low voltage level for about a predetermined time (e.g., 1 millisecond). In response to the voltage change on the secondary feedback node OCDRV, the voltage on the primary feedback node COMP drops below a predetermined voltage threshold (e.g., a low voltage less than 600 millivolts). The voltage change on node COMP wakes up the primary controller 110. From t8 to t9, the isolated power converter 100 is back to normal operation. The feedback loop is enabled to regulate the output voltage of the isolated power converter 100.

It should be noted that from t6 to t7, the waveforms of Vocdrv and Vcomp are different from those in a conventional sleep mode. In the conventional sleep mode, Vocdrv and Vcomp are pulled down to a low voltage so as to prevent the primary switch Q1 from switching. However, such a low voltage causes a bias current flowing through the opto-coupler, thereby increasing power consumption. In FIG. 5, from t6 to t7, Vocdrv and Vcomp are pulled up to a high voltage. As a result, the current following through the opto-coupler is cut off, thereby reducing power consumption.

Figure 6:
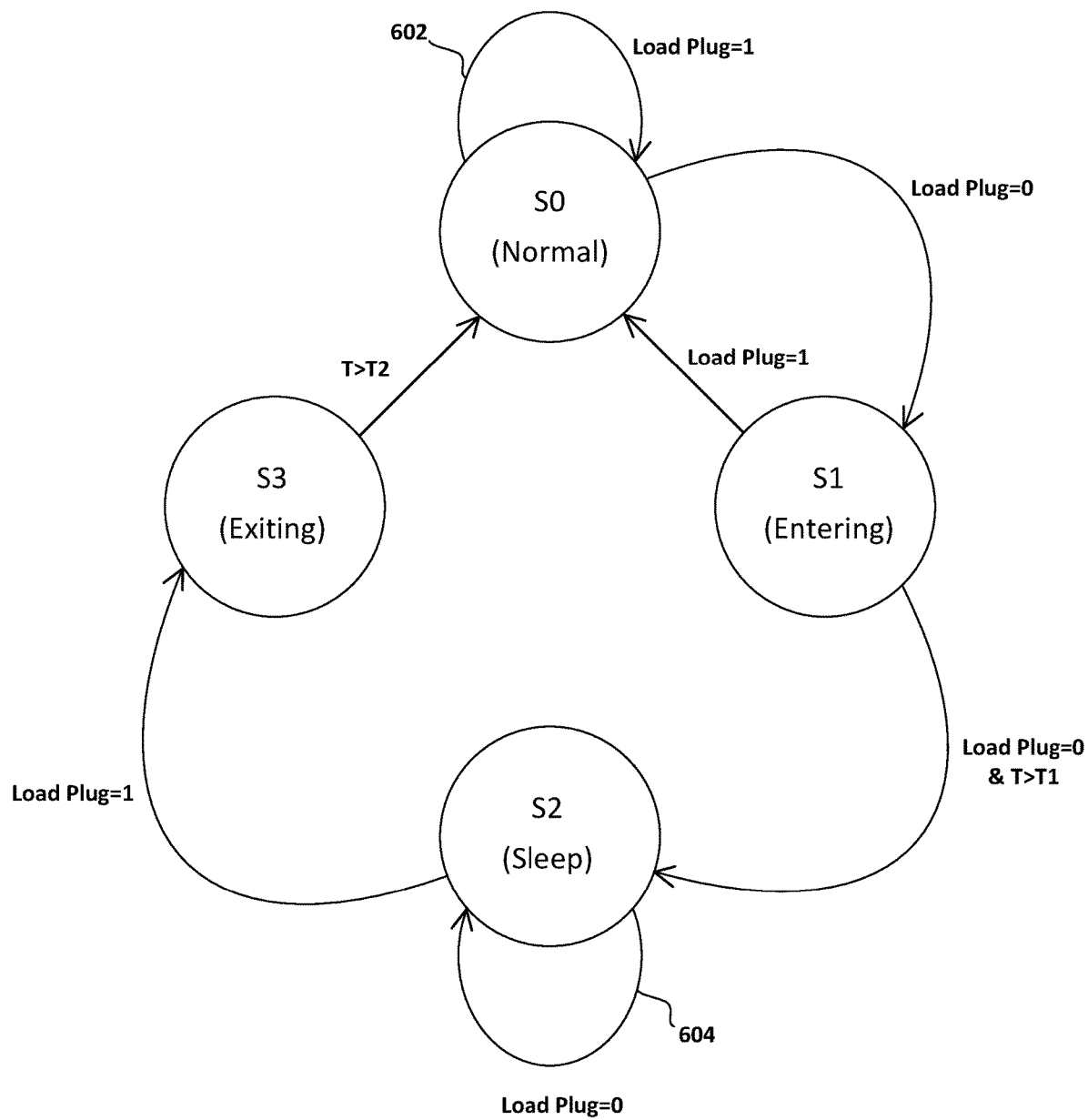
FIG. 6 illustrates a state machine for controlling the mode transition of the secondary controller in accordance with various embodiments of the present disclosure.

FIG. 6 illustrates a state machine for controlling the mode transition of the secondary controller in accordance with various embodiments of the present disclosure. The state machine includes four states, namely a normal state S0, an entering state S1, a sleep state S2 and an exiting state S3. Referring back to FIG. 5, the normal state S0 of the secondary controller 120 corresponds to the time prior to t3. The entering state S1 of the secondary controller 120 corresponds to the time between t3 and t6. The sleep state S2 of the secondary controller 120 corresponds to the time between t6 and t7. The exiting state S3 of the secondary controller 120 corresponds to the time between t7 and t8.

As used herein, the designation state machine is applied to a machine which can be in one of a number of states (e.g., states S0, S1, S2 and S3), the machine being in one state at a time with the ability to change from one state to another (e.g., a transition) upon to a triggering event of condition. Such a state machine may thus be defined by its states and the triggering conditions for the transitions between two states.

According to the state machine shown in FIG. 6, an event failing to lead to a transition may be represented by a line looping over an old state as exemplified by lines 602 and 604. Events leading to a transition from one state to another are indicated by arrows pointing to the new state starting from the old state as exemplified in FIG. 6.

The state machine allows state transitions between the normal state S0 and the entering state S1, from the entering state S1 to the sleep state S2, from the sleep state S2 to the exiting state S3, and from the exiting state S3 to the normal state S0.

Depending on whether the load 130 is connected to the isolated power converter 100, the secondary controller 120 may determine the different states of the secondary controller 120. As shown in FIG. 6, in a mode transition from the normal state S0 to the entering state S1, the transition from state S0 to state S1 is triggered if the following conditions can be satisfied: the load plug signal has a logic low state. In particular, once the load plug signal changes from a logic high state to a logic low state, the transition from state S0 to state S1 occurs. As shown in FIG. 6, in a mode transition from the entering state S1 to the normal state S0, the transition from state S1 to state S0 is triggered if the following conditions can be satisfied: the load plug signal has a logic high state. In particular, once the load plug signal changes from a logic low state to a logic high state, the transition from state S1 to state S0 occurs. In the normal state S0, the secondary bias current is about 5 milliamperes. The voltage on the secondary feedback node OCDRV is at its normal value under which the output voltage of the isolated power converter is regulated. In the entering state S1, the secondary bias current is about 0.6 milliamperes. The voltage on the secondary feedback node OCDRV is pulled down to a low voltage (e.g., a voltage approximately equal to zero volts). The time duration of the voltage on the secondary feedback node OCDRV staying at the low voltage is denoted as T.

As shown in FIG. 6, in a mode transition from the entering state S1 to the sleep state S2, the transition from state S1 to state S2 is triggered if the following conditions can be satisfied: the load plug signal has a logic low state, and T is greater than T1. T1 is a predetermined time threshold. In some embodiments, T1 is equal to 240 milliseconds. In the sleep state S2, the secondary bias current is about 30 microamperes. The secondary controller 120 configures the secondary feedback node OCDRV as a high impedance node.

As shown in FIG. 6, in a mode transition from the sleep state S2 to the exiting state S3, the transition from state S2 to state S3 is triggered if the following conditions can be satisfied: the load plug signal has a logic high state. In the exiting state S3, the secondary bias current is about 0.6 milliamperes. The voltage on the secondary feedback node OCDRV is pulled down to a low voltage (e.g., a voltage approximately equal to zero volts).

As shown in FIG. 6, in a mode transition from the exiting state S3 to the normal state S0, the transition from state S3 to state S0 is triggered if the following conditions can be satisfied: the time of the voltage on the secondary feedback node OCDRV staying at the low voltage is greater than a predetermined time T2. In some embodiments, T2 is equal to 1 millisecond.

Figure 7:
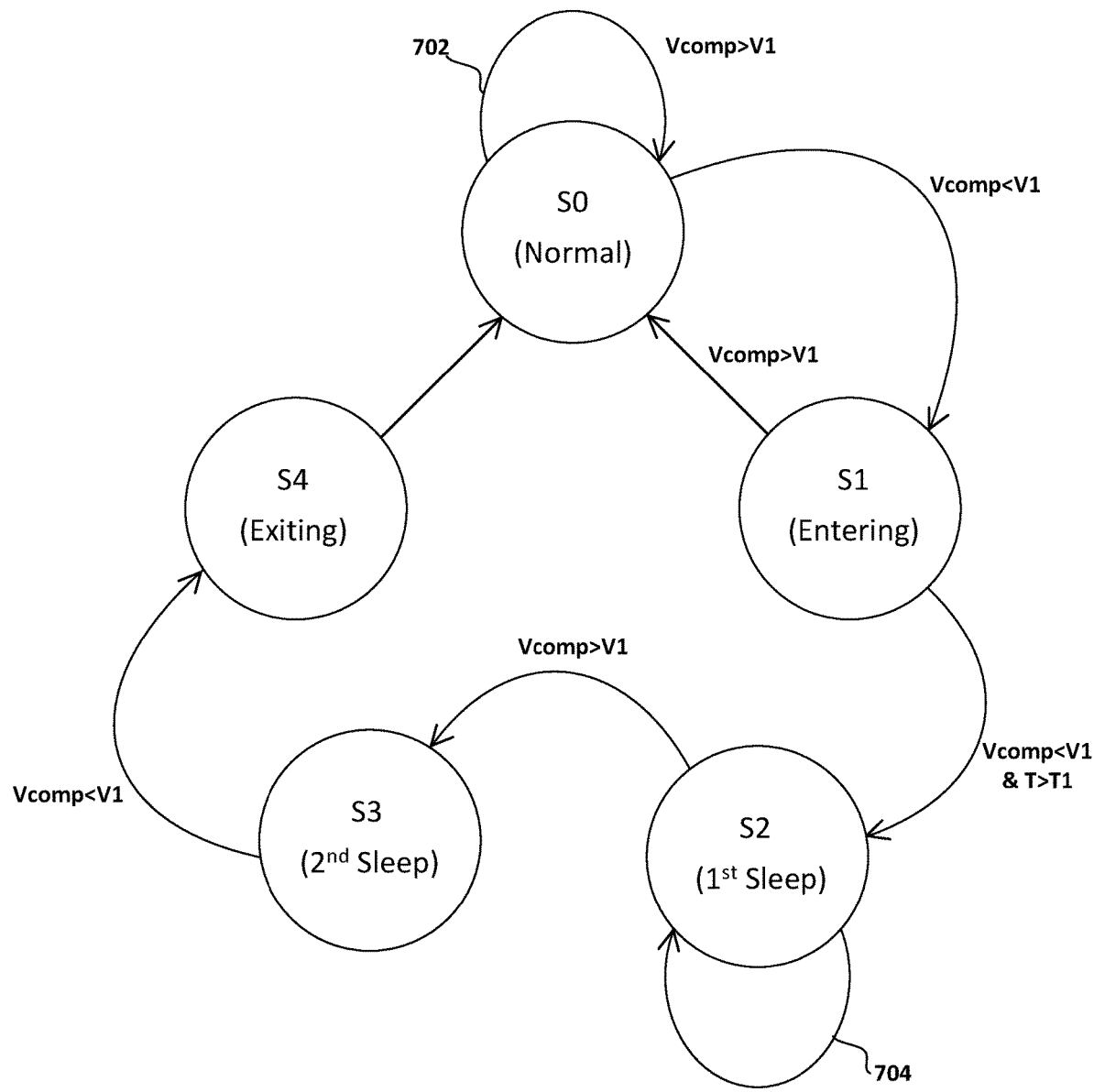
FIG. 7 illustrates a state machine for controlling the mode transition of the primary controller in accordance with various embodiments of the present disclosure.

FIG. 7 illustrates a state machine for controlling the mode transition of the primary controller in accordance with various embodiments of the present disclosure. The state machine includes five states, namely a normal state S0, an entering state S1, a first sleep state S2, a second sleep state S3 and an exiting state S4. Referring back to FIG. 5, the normal state S0 of the primary controller 110 corresponds to the time prior to t3. The entering state S1 of the primary controller 110 corresponds to the time between t3 and t5. The first sleep state S2 of the primary controller 110 corresponds to time between t5 and t6. The second sleep state S3 of the primary controller 110 corresponds to the time between t6 and t7. The exiting state S4 of the primary controller 110 corresponds to the time between t7 and t8.

As used herein, the designation state machine is applied to a machine which can be in one of a number of states (e.g., states S0, S1, S2, S3 and S4), the machine being in one state at a time with the ability to change from one state to another (e.g., a transition) upon to a triggering event of condition. Such a state machine may thus be defined by its states and the triggering conditions for the transitions between two states.

According to the state machine shown in FIG. 7, an event failing to lead to a transition may be represented by a line looping over an old state as exemplified by lines 702 and 704. Events leading to a transition from one state to another are indicated by arrows pointing to the new state starting from the old state as exemplified in FIG. 7.

The state machine allows state transitions between the normal state S0 and the entering state S1, from the entering state S1 to the first sleep state S2, from the first sleep state S2 to the second sleep state S3, from the second sleep state S3 to the exiting state S4, and from the exiting state S4 to the normal state S0.

Depending on whether the load 130 is connected to the isolated power converter 100, the primary controller 110 may determine the different states of the primary controller. As shown in FIG. 7, in a mode transition from the normal state S0 to the entering state S1, the transition from state S0 to state S1 is triggered if the following conditions can be satisfied: the voltage on the primary feedback node COMP drops below a low voltage V1. In some embodiments, V1 is equal to 600 millivolts.

As shown in FIG. 7, in a mode transition from the entering state S1 to the normal state S0, the transition from state S1 to state S0 is triggered if the following conditions can be satisfied: the voltage on the primary feedback node COMP increases to a level greater than V1.

In the normal state S0, the primary bias current is about 5 milliamperes. The voltage on the primary feedback node COMP is at its normal value under which the output voltage of the isolated power converter 100 is regulated. In the entering state S1, the primary bias current remains the same. The voltage on the primary feedback node COMP stays at the low voltage. The time duration of the voltage on the primary feedback node COMP staying at the low voltage is denoted as T.

As shown in FIG. 7, in a mode transition from the entering state S1 to the first sleep state S2, the transition from state S1 to state S2 is triggered if the following conditions can be satisfied: the voltage on the primary feedback node COMP is less than V1, and T is greater than T1. T1 is a predetermined voltage threshold. In some embodiments, T1 is equal to 200 milliseconds. In the first sleep state S2, the primary bias current is about 70 microamperes. The primary controller 110 disables the feedback control loop (e.g., disabling the oscillator of the isolated power converter).

As shown in FIG. 7, in a mode transition from the first sleep state S2 to the second sleep state S3, the transition from state S2 to state S3 is triggered if the following conditions can be satisfied: the voltage on the primary feedback node COMP is greater than V1. In the second sleep state S3, the primary bias current remains the same.

As shown in FIG. 7, in a mode transition from the second sleep state S3 to the exiting state S4, the transition from state S3 to state S4 is triggered if the following conditions can be satisfied: the voltage on the primary feedback node COMP is less than V1. In the exiting state S4, the primary bias current is about 5 milliamperes. The isolated power converter 100 enters into a soft start process in which the output voltage is established. The voltage on the primary feedback node COMP is back to its normal value under which the output voltage is regulated.

As shown in FIG. 7, in a mode transition from the exiting state S4 to the normal state S0, the transition from state S4 to state S0 is triggered once the soft start process finishes.

Figure 8:
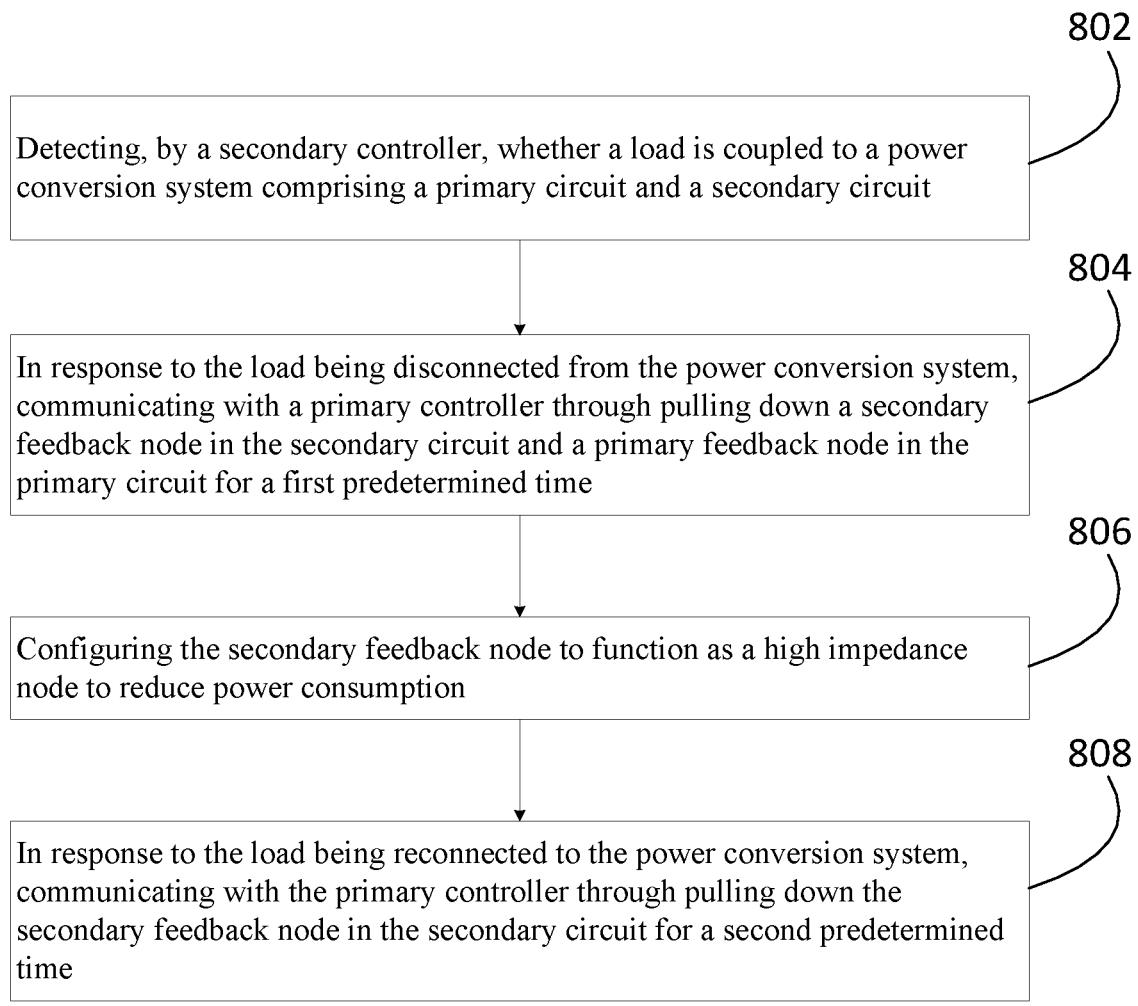
FIG. 8 illustrates a flow chart of controlling the power conversion system shown in FIG. 1 in accordance with various embodiments of the present disclosure.

FIG. 8 illustrates a flow chart of controlling the power conversion system shown in FIG. 1 in accordance with various embodiments of the present disclosure. This flowchart shown in FIG. 8 is merely an example, which should not unduly limit the scope of the claims. One of ordinary skill in the art would recognize many variations, alternatives, and modifications. For example, various steps illustrated in FIG. 8 may be added, removed, replaced, rearranged and repeated.

Referring back to FIG. 1, the power conversion system comprises an isolated power converter 100 coupled between a power source VIN and a load 130. A primary controller 110 is configured to control the operation of a primary switch of the isolated power converter 100. A secondary controller 120 is configured to detect whether the load 130 is connected to the isolated power converter 100. A secondary feedback circuit 125 is configured to detect the output voltage of the isolated power converter 100, and generate a feedback signal fed into a primary feedback circuit 115 through an isolation interface 140. Based on the received feedback signal, the primary feedback circuit 115 generates a primary side feedback signal Vcomp fed into the primacy controller 110. Based on Vcomp, the primary controller 110 generates a PWM signal for regulating the output voltage of the isolated power converter 100.

In operation, the load 130 may be disconnected from the isolated power converter 100. In order to further reduce power consumption, the secondary controller 120 and the primary controller 110 perform the following steps.

At step 802, a secondary controller detects whether a load is coupled to a power conversion system comprising a primary circuit and a secondary circuit.

At step 804, in response to the load being disconnected from the power conversion system, the secondary controller communicates with a primary controller through pulling down a secondary feedback node in the secondary circuit and a primary feedback node in the primary circuit for a first predetermined time.

At step 806, the secondary controller configures the secondary feedback node to function as a high impedance node to reduce power consumption.

At step 808, in response to the load being reconnected to the power conversion system, the secondary controller communicates with the primary controller through pulling down the secondary feedback node in the secondary circuit for a second predetermined time.

The method further comprises detecting, by the primary controller, whether a voltage on the primary feedback node in the primary circuit is lower than a predetermined voltage for a third predetermined time, in response to the voltage on the primary feedback node lower than the predetermined voltage for the third predetermined time, entering into a first sleep mode through disabling a feedback loop of the power conversion system, entering into a second sleep mode once the voltage on the primary feedback node increases to a level greater than the predetermined voltage, and in response to the voltage on the primary feedback node lower than the predetermined voltage again, enabling the feedback loop to restart the power conversion system.

The method further comprises configuring the primary controller to operate in a primary entering mode once the voltage on the primary feedback node drops below the predetermined voltage, and entering into the first sleep mode once the primary controller stays in the primary entering mode for more than the third predetermined time.

The method further comprises configuring the primary controller to operate in the second sleep mode once the voltage on the primary feedback node increases to the level greater than the predetermined voltage, and configuring the primary controller to enter into a primary exiting mode once the voltage on the primary feedback node drops below the predetermined voltage again.

The method further comprises configuring the secondary controller to operate in a secondary entering mode once the secondary controller detects the load being disconnected from the power conversion system, and pulling down the secondary feedback node in the secondary circuit for the first predetermined time unless the load is reconnected to the power conversion system.

The method further comprises configuring the secondary controller to enter into a sleep mode once the secondary controller stays in the secondary entering mode for more than the first predetermined time, and in the sleep mode, configuring the secondary feedback node to function as a high impedance node.

The method further comprises configuring the secondary controller to enter into a secondary exiting mode once the secondary controller detects the load being reconnected to the power conversion system, and in the secondary exiting mode, pulling down the secondary feedback node in the secondary circuit for the second predetermined time.

The primary controller is coupled to the secondary controller through an opto-coupler comprising a light-emitting diode and a phototransistor. The secondary circuit comprises a resistor divider, a compensation network, and a three-terminal adjustable precision shunt voltage regulator integrated circuit, and wherein a cathode of the three-terminal adjustable precision shunt voltage regulator integrated circuit is connected to the cathode of the light-emitting diode, a reference terminal of the three-terminal adjustable precision shunt voltage regulator integrated circuit is connected to the compensation network and the resistor divider, and an anode of the three-terminal adjustable precision shunt voltage regulator integrated circuit is connected to ground, and wherein the secondary feedback node in the secondary circuit is the cathode of the light-emitting diode, and the primary circuit comprises a pull-up resistor and a capacitor connected in series between a bias voltage and ground, and wherein a first terminal of the phototransistor is connected to a common node of the pull-up resistor and the capacitor, and a second terminal of the phototransistor is connected to ground, and wherein the primary feedback node in the primary circuit is the common node of the pull-up resistor and the capacitor.

The primary controller is coupled to the secondary controller through an opto-coupler comprising a light-emitting diode and a phototransistor. The secondary circuit comprises a resistor divider, a compensation network, and an operation amplifier, and wherein the compensation network is connected between an output of the operation amplifier and an inverting input of the operation amplifier, the inverting input of the operation amplifier is connected to a midpoint of the resistor divider, and a non-inverting input of the operation amplifier is connected to a predetermined reference, and the primary circuit comprises a pull-up resistor and a capacitor connected in series between a bias voltage and ground, and wherein a first terminal of the phototransistor is connected to a common node of the pull-up resistor and the capacitor, and a second terminal of the phototransistor is connected to ground.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus comprising:
   a secondary controller coupled to a secondary circuit of a power conversion system; and
   a primary controller coupled to a primary circuit of the power conversion system, the primary controller being coupled to the secondary controller through an isolation interface, wherein the secondary controller is configured to:
   detect whether a load is coupled to the power conversion system;
   in response to the load being disconnected from the power conversion system, communicate with the primary controller to enter a sleep mode through pulling down a secondary feedback node in the secondary circuit and a primary feedback node in the primary circuit for a first predetermined time, wherein in the sleep mode, both primary and secondary circuits are disabled to reduce power consumption;
   provide a high impedance at the secondary feedback node to reduce power consumption, wherein the high impedance at the secondary feedback node causes a voltage on the primary feedback node to increase toward a high level during the sleep mode; and
   in response to the load being reconnected to the power conversion system, communicate with the primary controller to exit the sleep mode through pulling down the secondary feedback node in the secondary circuit for a second predetermined time, wherein after exiting the sleep mode, the primary and secondary circuits are enabled to recover feedback loop control to regulate an output voltage of the power conversion system.

2. The apparatus of claim 1, wherein: the primary controller is configured to detect whether the voltage on the primary feedback node in the primary circuit is lower than a predetermined voltage for a third predetermined time, in response to the voltage on the primary feedback node lower than the predetermined voltage for the third predetermined time, enter into the sleep mode through disabling a feedback loop of the power conversion system, and in response to the voltage on the primary feedback node lower than the predetermined voltage again, enable the feedback loop to restart the power conversion system.

3. The apparatus of claim 1, wherein:
   the isolation interface is an opto-coupler comprising a light-emitting diode and a phototransistor;
   the secondary circuit comprises a resistor divider, a compensation network, and a voltage regulation circuit, and wherein an output of the voltage regulation circuit is coupled to a cathode of the light-emitting diode; and
   the primary circuit comprises a pull-up resistor and a capacitor connected in series between a bias voltage and ground, and wherein:
      a first terminal of the phototransistor is connected to a common node of the pull-up resistor and the capacitor; and
      a second terminal of the phototransistor is connected to ground.

4. The apparatus of claim 3, wherein:
   the voltage regulation circuit is a three-terminal adjustable precision shunt voltage regulator integrated circuit, wherein:
      a cathode of the three-terminal adjustable precision shunt voltage regulator integrated circuit is coupled to the cathode of the light-emitting diode;
      a reference terminal of the three-terminal adjustable precision shunt voltage regulator integrated circuit is connected to the compensation network and the resistor divider; and
      an anode of the three-terminal adjustable precision shunt voltage regulator integrated circuit is connected to ground.

5. The apparatus of claim 3, wherein:
   the secondary feedback node in the secondary circuit is the cathode of the light-emitting diode; and
   the primary feedback node in the primary circuit is the common node of the pull-up resistor and the capacitor.

6. The apparatus of claim 3, wherein:
   the voltage regulation circuit is an operation amplifier, wherein:
      the compensation network is connected between an output of the operation amplifier and an inverting input of the operation amplifier;
      the inverting input of the operation amplifier is connected to a midpoint of the resistor divider; and
      a non-inverting input of the operation amplifier is connected to a predetermined reference.

7. The apparatus of claim 1, wherein:
   the power conversion system comprises a flyback power converter.

8. A method comprising:
   detecting, by a secondary controller, whether a load is coupled to a power conversion system comprising a primary circuit and a secondary circuit;
   in response to the load being disconnected from the power conversion system, communicating with a primary controller to enter a sleep mode through pulling down a secondary feedback node in the secondary circuit and a primary feedback node in the primary circuit for a first predetermined time;
   configuring the secondary feedback node to function as a high impedance node to reduce power consumption, wherein the secondary feedback node functioning as the high impedance node causes a voltage on the primary feedback node to increase toward a high level during the sleep mode; and
   in response to the load being reconnected to the power conversion system, communicating with the primary controller through pulling down the secondary feedback node in the secondary circuit for a second predetermined time.

9. The method of claim 8, further comprising: detecting, by the primary controller, whether the voltage on the primary feedback node in the primary circuit is lower than a predetermined voltage for a third predetermined time; in response to the voltage on the primary feedback node lower than the predetermined voltage for the third predetermined time, entering into a first sleep mode through disabling a feedback loop of the power conversion system; entering into a second sleep mode once the voltage on the primary feedback node increases to a level greater than the predetermined voltage; and in response to the voltage on the primary feedback node lower than the predetermined voltage again, enabling the feedback loop to restart the power conversion system.

10. The method of claim 9, further comprising:
configuring the primary controller to operate in a primary entering mode once the voltage on the primary feedback node drops below the predetermined voltage; and
entering into the first sleep mode once the primary controller stays in the primary entering mode for more than the third predetermined time.

11. The method of claim 9, further comprising:
configuring the primary controller to operate in the second sleep mode once the voltage on the primary feedback node increases to the level greater than the predetermined voltage; and
configuring the primary controller to enter into a primary exiting mode once the voltage on the primary feedback node drops below the predetermined voltage again.

12. The method of claim 8, further comprising:
configuring the secondary controller to operate in a secondary entering mode once the secondary controller detects the load being disconnected from the power conversion system; and
pulling down the secondary feedback node in the secondary circuit for the first predetermined time unless the load is reconnected to the power conversion system.

13. The method of claim 12, further comprising:
configuring the secondary controller to enter into a sleep mode once the secondary controller stays in the secondary entering mode for more than the first predetermined time; and
in the sleep mode, configuring the secondary feedback node to function as a high impedance node.

14. The method of claim 13, further comprising:
configuring the secondary controller to enter into a secondary exiting mode once the secondary controller detects the load being reconnected to the power conversion system; and
in the secondary exiting mode, pulling down the secondary feedback node in the secondary circuit for the second predetermined time.

15. The method of claim 8, wherein:
the primary controller is coupled to the secondary controller through an opto-coupler comprising a light-emitting diode and a phototransistor;
the secondary circuit comprises a resistor divider, a compensation network, and a three-terminal adjustable precision shunt voltage regulator integrated circuit, and wherein:
a cathode of the three-terminal adjustable precision shunt voltage regulator integrated circuit is connected to the cathode of the light-emitting diode;
a reference terminal of the three-terminal adjustable precision shunt voltage regulator integrated circuit is connected to the compensation network and the resistor divider; and
an anode of the three-terminal adjustable precision shunt voltage regulator integrated circuit is connected to ground, and wherein the secondary feedback node in the secondary circuit is the cathode of the light-emitting diode; and
the primary circuit comprises a pull-up resistor and a capacitor connected in series between a bias voltage and ground, and wherein:
a first terminal of the phototransistor is connected to a common node of the pull-up resistor and the capacitor; and
a second terminal of the phototransistor is connected to ground, and wherein the primary feedback node in the primary circuit is the common node of the pull-up resistor and the capacitor.

16. The method of claim 8, wherein:
the primary controller is coupled to the secondary controller through an opto-coupler comprising a light-emitting diode and a phototransistor;
the secondary circuit comprises a resistor divider, a compensation network, and an operation amplifier, and wherein:
the compensation network is connected between an output of the operation amplifier and an inverting input of the operation amplifier;
the inverting input of the operation amplifier is connected to a midpoint of the resistor divider; and
a non-inverting input of the operation amplifier is connected to a predetermined reference; and
the primary circuit comprises a pull-up resistor and a capacitor connected in series between a bias voltage and ground, and wherein:
a first terminal of the phototransistor is connected to a common node of the pull-up resistor and the capacitor; and
a second terminal of the phototransistor is connected to ground.

17. A system comprising: an isolated power converter configured to be coupled between a power source and a load; a secondary controller coupled to a secondary circuit of the system; and a primary controller coupled to a primary circuit of the system, the primary controller being coupled to the secondary controller through an isolation interface, wherein: the secondary controller is configured to detect whether the load is coupled to the isolated power converter, inform the primary controller through pulling down a secondary feedback node in the secondary circuit and a primary feedback node in the primary circuit for a first predetermined time in response to the load being disconnected from the isolated power converter, and reduce power consumption of the secondary circuit through configuring the secondary feedback node as a high impedance node, wherein the secondary feedback node functioning as the high impedance node causes a voltage on the primary feedback node to increase toward a high level during a sleep mode; and the primary controller is configured to disable a feedback control loop of the isolated power converter once the load is disconnected from the isolated power converter.

18. The system of claim 17, wherein: the secondary controller is configured to detect whether the load is coupled to the isolated power converter, and in response to the load being reconnected to the isolated power converter, communicate with the primary controller through pulling down the secondary feedback node in the secondary circuit for a second predetermined time; and the primary controller is configured to detect whether the voltage on the primary feedback node in the primary circuit is lower than a predetermined voltage for a third predetermined time, in response to the voltage on the primary feedback node lower than the predetermined voltage for the third predetermined time, enter into a first sleep mode through disabling a feedback loop of the isolated power converter, enter into a second sleep mode once the voltage on the primary feedback node increases to a level greater than the predetermined voltage, and in response to the voltage on the primary feedback node lower than the predetermined voltage again, enable the feedback loop to restart the isolated power converter.

19. The system of claim 17, further comprising:
the primary controller is coupled to the secondary controller through an opto-coupler comprising a light-emitting diode and a phototransistor;
the secondary circuit comprises a resistor divider, a compensation network, and a three-terminal adjustable precision shunt voltage regulator integrated circuit, and wherein:
  a cathode of the three-terminal adjustable precision shunt voltage regulator integrated circuit is connected to the cathode of the light-emitting diode;
  a reference terminal of the three-terminal adjustable precision shunt voltage regulator integrated circuit is connected to the compensation network and the resistor divider; and
  an anode of the three-terminal adjustable precision shunt voltage regulator integrated circuit is connected to ground, and wherein the secondary feedback node in the secondary circuit is the cathode of the light-emitting diode; and
the primary circuit comprises a pull-up resistor and a capacitor connected in series between a bias voltage and ground, and wherein:
  a first terminal of the phototransistor is connected to a common node of the pull-up resistor and the capacitor; and
  a second terminal of the phototransistor is connected to ground, and wherein the primary feedback node in the primary circuit is the common node of the pull-up resistor and the capacitor.

20. The system of claim 17, further comprising:
the primary controller is coupled to the secondary controller through an opto-coupler comprising a light-emitting diode and a phototransistor;
the secondary circuit comprises a resistor divider, a compensation network, and an operation amplifier, and wherein:
  the compensation network is connected between an output of the operation amplifier and an inverting input of the operation amplifier;
  the inverting input of the operation amplifier is connected to a midpoint of the resistor divider; and
  a non-inverting input of the operation amplifier is connected to a predetermined reference; and
the primary circuit comprises a pull-up resistor and a capacitor connected in series between a bias voltage and ground, and wherein:
  a first terminal of the phototransistor is connected to a common node of the pull-up resistor and the capacitor; and
  a second terminal of the phototransistor is connected to ground.

* * * * *